(12) United States Patent
Derza

(10) Patent No.: US 11,537,800 B1
(45) Date of Patent: Dec. 27, 2022

(54) AUTOMATED SIG CODE TRANSLATION USING MACHINE LEARNING

(71) Applicant: WALGREEN CO., Deerfield, IL (US)

(72) Inventor: Oliver Derza, Willowbrook, IL (US)

(73) Assignee: WALGREEN CO., Deerfield, IL (US)

( * ) Notice: Subject to any disclaimer, the term of this patent is extended or adjusted under 35 U.S.C. 154(b) by 180 days.

(21) Appl. No.: 16/870,536

(22) Filed: May 8, 2020

(51) Int. Cl.
| | |
|---|---|
| *G10L 21/00* | (2013.01) |
| *G06F 40/58* | (2020.01) |
| *G06F 9/54* | (2006.01) |
| *G06F 40/295* | (2020.01) |
| *G06N 5/04* | (2006.01) |
| *G06N 20/00* | (2019.01) |

(52) U.S. Cl.
CPC ............ *G06F 40/58* (2020.01); *G06F 9/54* (2013.01); *G06F 40/295* (2020.01); *G06N 5/04* (2013.01); *G06N 20/00* (2019.01)

(58) Field of Classification Search
CPC .......... G06F 40/58; G06F 40/295; G06F 9/54; G06N 20/00; G06N 5/04; H04L 9/3231; G10L 17/005
USPC ........................................................ 704/2
See application file for complete search history.

(56) References Cited

U.S. PATENT DOCUMENTS

| | | | |
|---|---|---|---|
| 10,726,847 B1 * | 7/2020 | Hardage | G10L 17/005 |
| 2017/0068798 A1 | 3/2017 | Akinwale et al. | |
| 2021/0081517 A1 * | 3/2021 | Atkinson | H04L 9/3231 |

* cited by examiner

*Primary Examiner* — Md S Elahee
(74) *Attorney, Agent, or Firm* — Marshall, Gerstein & Borun LLP; Randall G. Rueth

(57) ABSTRACT

A pharmacy management system for automated sig code translation using machine learning includes a processor and a memory storing instructions that, when executed by the one or more processors, cause the pharmacy management system to train a machine learning model to analyze sig codes, receive a sig code, analyze the sig code utterance and generate an output corresponding to the sig code utterance. A computer-implemented method includes training a machine learning model to analyze sig codes, receiving a sig code, analyzing the sig code utterance, and generating an output corresponding to the sig code utterance. A non-transitory computer readable medium containing program instructions that when executed, cause a computer to: train a machine learning model to analyze sig codes, receive a sig code, analyze the sig code utterance, and generate an output corresponding to the sig code utterance.

20 Claims, 4 Drawing Sheets

AUTOMATED SIG CODE TRANSLATION USING MACHINE LEARNING

TECHNICAL FIELD

The present disclosure is generally directed to methods and systems for automated sig code translation using machine learning, and more specifically, for training and operating natural language models to identify sig codes.

BACKGROUND

Medical professionals such as physicians, pharmacists, pharmacy technicians, etc. use shorthand abbreviations, commonly referred to as SIGs or sig codes to specify directions for use of a medicine. Sig codes are commonly used to encode instructions for a patient to follow during a prescription regimen, and may be printed on packaging (e.g., in an information sheet accompanying a prescription, on a bottle, inhaler, etc.)

A physician may specify a compressed sig code when authoring a medical prescription or script. In some cases, a pharmacy technician or pharmacist may convert the compressed sig code to an expanded sig code that may be more readable by a patient. The term "sig" is an abbreviation for the Latin term "signa," meaning mark, stamp, designation or label. Sig codes may be used to specify a number of attributes of a prescription, including a quantity, a dosing form/route of administration, a frequency, a duration, etc. However, interpreting sig codes is challenging for a number of reasons.

First, sig codes are expressed in natural language and may include information that appears in any order. Second, sig codes are not standardized. For example, two physicians may use different terms to refer to a single meaning (e.g., 5x/d, five times daily, etc.). Two pharmacists may reach different conclusions as to the meaning and/or interpretation of a given sig code. Third, sig codes may be ambiguous. For example, a physician may enter the term novo7030. Such a term could mean NovoLIN 70/30 or NovoLOG 70/30. Such ambiguities can result in confusion, or worse, danger. Other types of ambiguity/error may arise, such as when scripts are hand-written. For example, a hand-written abbreviation such as "U" for unit may be misinterpreted as a zero.

In sum, the conventional use of sig codes by medical professionals and at pharmacies complicates efforts to implement technological improvements. Given the many variations in spelling and meaning of sig codes, approaches relying on explicit programming (e.g., using string matching and/or regular expressions) result in inefficient and overly complex codebases that are difficult to debug and impose an extreme ongoing maintenance burden on developers. As pharmacy systems become increasingly more digitized and networked, the presence of unstructured and cryptic sig codes causes duplicative efforts and error-prone techniques.

BRIEF SUMMARY

In one aspect, a pharmacy management system for automated sig code translation using machine learning includes one or more processors; and a memory storing instructions that, when executed by the one or more processors, cause the pharmacy management system to train, via the one or more processors, a machine learning model to analyze sig code utterances, receive the sig code utterance, analyze the sig code utterance using the trained machine learning model, wherein the analyzing includes identifying one or more entities within the sig code utterance, and wherein the one or more entities includes at least one quantity entity and at least one frequency entity; and generate an output corresponding to the sig code utterance including one or more entity results, each entity result including an entity type, an entity name, and an entity normalized value corresponding to a respective one of the one or more entities within the sig code utterance.

In another aspect, a computer-implemented method for automated sig code translation using machine learning includes training, via the one or more processors, a machine learning model to analyze sig code utterances, receiving the sig code utterance, analyzing the sig code utterance using the trained machine learning model, wherein the analyzing includes identifying one or more entities within the sig code utterance, and wherein the one or more entities includes at least one quantity entity and at least one frequency entity; and generating an output corresponding to the sig code utterance including one or more entity results, each entity result including an entity type, an entity name, and an entity normalized value corresponding to a respective one of the one or more entities within the sig code utterance.

In yet another aspect, a non-transitory computer readable medium includes program instructions that when executed, cause a computer to train a machine learning model to analyze sig code utterances, receive the sig code utterance, analyze the sig code utterance using the trained machine learning model, wherein the analyzing includes identifying one or more entities within the sig code utterance, and wherein the one or more entities includes at least one quantity entity and at least one frequency entity; and generate an output corresponding to the sig code utterance including one or more entity results, each entity result including an entity type, an entity name, and an entity normalized value corresponding to a respective one of the one or more entities within the sig code utterance.

BRIEF DESCRIPTION OF THE FIGURES

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

The figures depict preferred embodiments for purposes of illustration only. One of ordinary skill in the art will readily recognize from the following discussion that alternative embodiments of the systems and methods illustrated herein may be employed without departing from the principles of the invention described herein.

DETAILED DESCRIPTION

Overview

The embodiments described herein relate to, inter alia, techniques for automated translation of sig codes expressed in natural language using machine learning (ML) techniques. In some embodiments, an application executing in a pharmacy computing system trains one or more machine learning model to analyze a sig code expressed in natural language to identify one or more intents and/or one or more entities contained within the sig code. The application may validate the one or more intents and/or the one or more entities. The application may operate the trained ML model to generate structured output that may be hierarchical, in some embodiments. The structured output may be expressed using a structured notation language (e.g., JavaScript Object Notation (JSON), eXtensible Markup Language (XML), etc.). The structured output may be provided to another system to facilitate further automated processing. Herein, the terms "provider", "prescriber", and "physician" may be used interchangeably. "Patient" and "user" generally refer to customers of the pharmacy to whom medications are prescribed.

Exemplary Computing Environment

Figure 1:
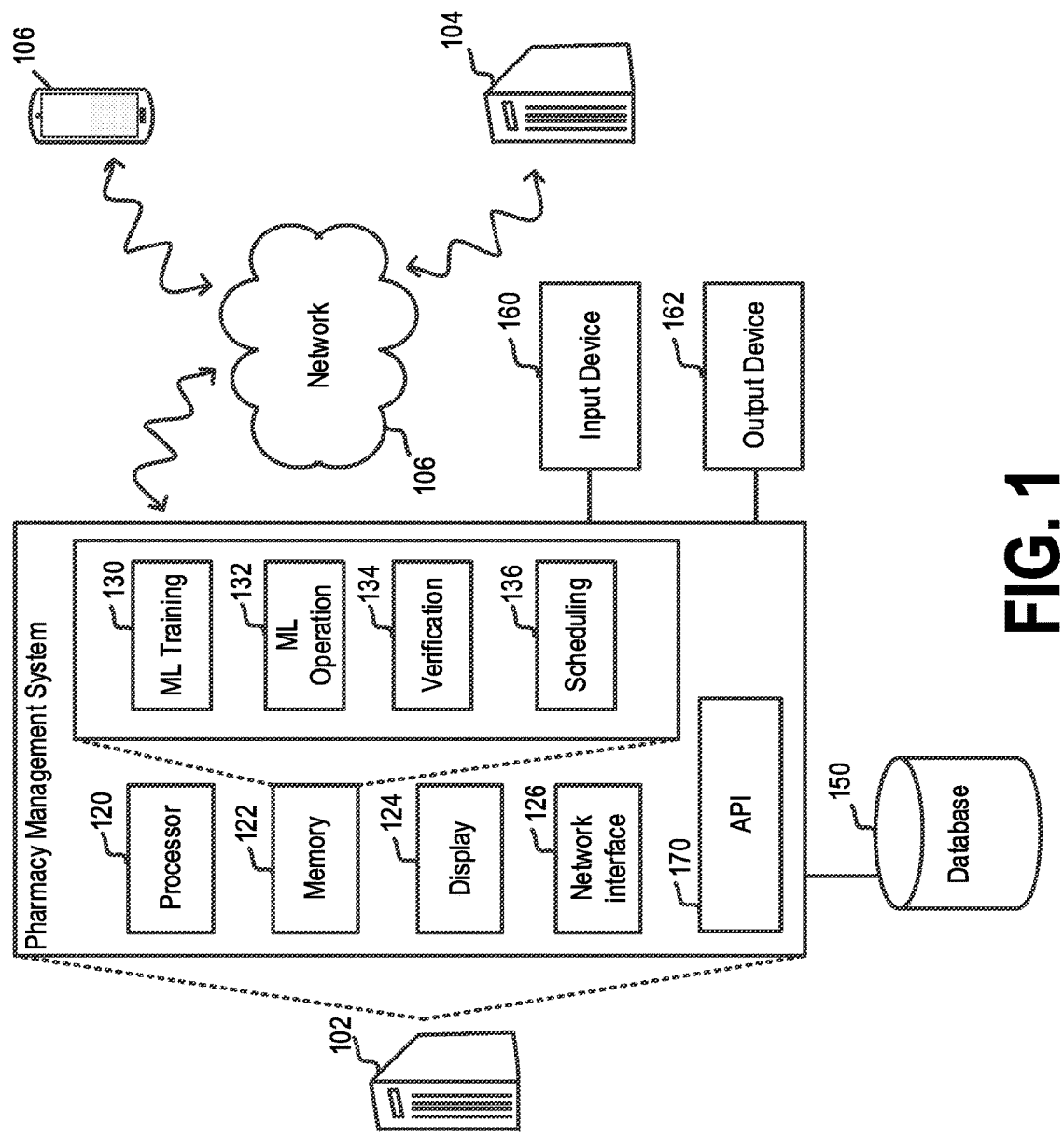
FIG. 1 depicts an exemplary computing environment in which techniques for automated sig code translation using machine learning may be implemented according to one embodiment.

FIG. 1 depicts an exemplary computing environment 100 in which techniques for automated sig code translation using machine learning, according to an embodiment.

The environment 100 includes a pharmacy management system 102, a physician computing system 104 and a patient computing device 106, all communicatively coupled via a network 108.

The pharmacy management system 102 may be located within a pharmacy or may be remote to the pharmacy. In some embodiments, multiple pharmacy management systems 102 may be implemented in the pharmacy and/or remote to the pharmacy. Generally, a user (e.g., a pharmacist, a medical doctor, a pharmacy technician, etc.) may access the pharmacy management system 102 to access pharmacy information for the provision of service to a pharmacy customer.

The pharmacy management system 102 may be an individual server, a group (e.g., cluster) of multiple servers, or another suitable type of computing device or system (e.g., a collection of cloud computing resources). One or more components of the pharmacy management system 102 may be provided by virtual instances (e.g., cloud-based virtualization services).

The pharmacy management system 102 includes a processor 120. The processor 120 may include any suitable number of processors and/or processor types, such as CPUs and one or more graphics processing units (GPUs). Generally, the processor 120 is configured to execute software instructions stored in a memory 124. The memory 124 may include one or more persistent memories (e.g., a hard drive/solid state memory) and stores one or more sets of computer executable instructions/modules, including a machine learning training module 130, a machine learning operation module 132, a verification module 134 and a scheduling module 136, as described in more detail below. The pharmacy management system 102 further includes a network interface controller (NIC) 126 that may include any suitable network interface controller(s), such as wired/wireless controllers (e.g., Ethernet controllers). The NIC 126 facilitates bidirectional/multiplexed networking over the network 108 between the pharmacy management system 102 other components of the environment 100 (e.g., the physician computing system 104 and the patient computing device 106).

The pharmacy management system 102 may include a pharmacy database 150, which may be implemented as a relational database management system (RDBMS). For example, the pharmacy database 150 may include one or more structured query language (SQL) databases, a NoSQL database, a flat file storage system, or any other suitable data storage system/configuration. In general, the pharmacy database 150 may store prescription information related to patients, patient profile information, ML training data, ML models and/or initialization parameters and/or outputs generated by one or more ML models. The pharmacy database 150 may receive its contents from the pharmacy management system 102, the physician computing system 104 and/or the patient device 106. In some embodiments, the pharmacy database 150 may be located remote from the pharmacy management system 102 and accessed via the network 108.

The pharmacy management system 102 may be associated with (e.g., owned/operated by) a company that sells commercial, medical, financial, etc. products and/or services, and/or may be associated with an entity that provides prescription medicine to patients. The modules stored in the memory 122 of the pharmacy management system 102 include respective sets of computer-executable instructions for performing specific functions.

The machine learning training module 130 may include instructions executed by the processor 120 for initializing and training one or more machine learning models. In general, the ML training module 130 may train models by, inter alia, establishing a network architecture, or topology, and adding layers that may be associated with one or more activation functions (e.g., a rectified linear unit, softmax, etc.), loss functions and/or optimization functions. Multiple different types of artificial neural networks may be employed, including without limitation, recurrent neural networks, convolutional neural networks, and deep learning neural networks. Data sets used to train the artificial neural network(s) may be divided into training, validation, and testing subsets; these subsets may be encoded in an N-dimensional tensor, array, matrix, or other suitable data structures. Training may be performed by iteratively training the network using labeled training samples. Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned", values.

In an embodiment, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In some embodiments, multiple artificial neural networks may be separately trained and operated, and/or separately trained and operated in conjunction.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data (e.g., de novo sig codes based on analysis of historical sig codes). Models may be created based upon example inputs in order to make valid and reliable predictions for novel inputs. For example, a deep learning ANN may be trained using sig codes to generalize about previously unseen sig codes.

Figure 3:
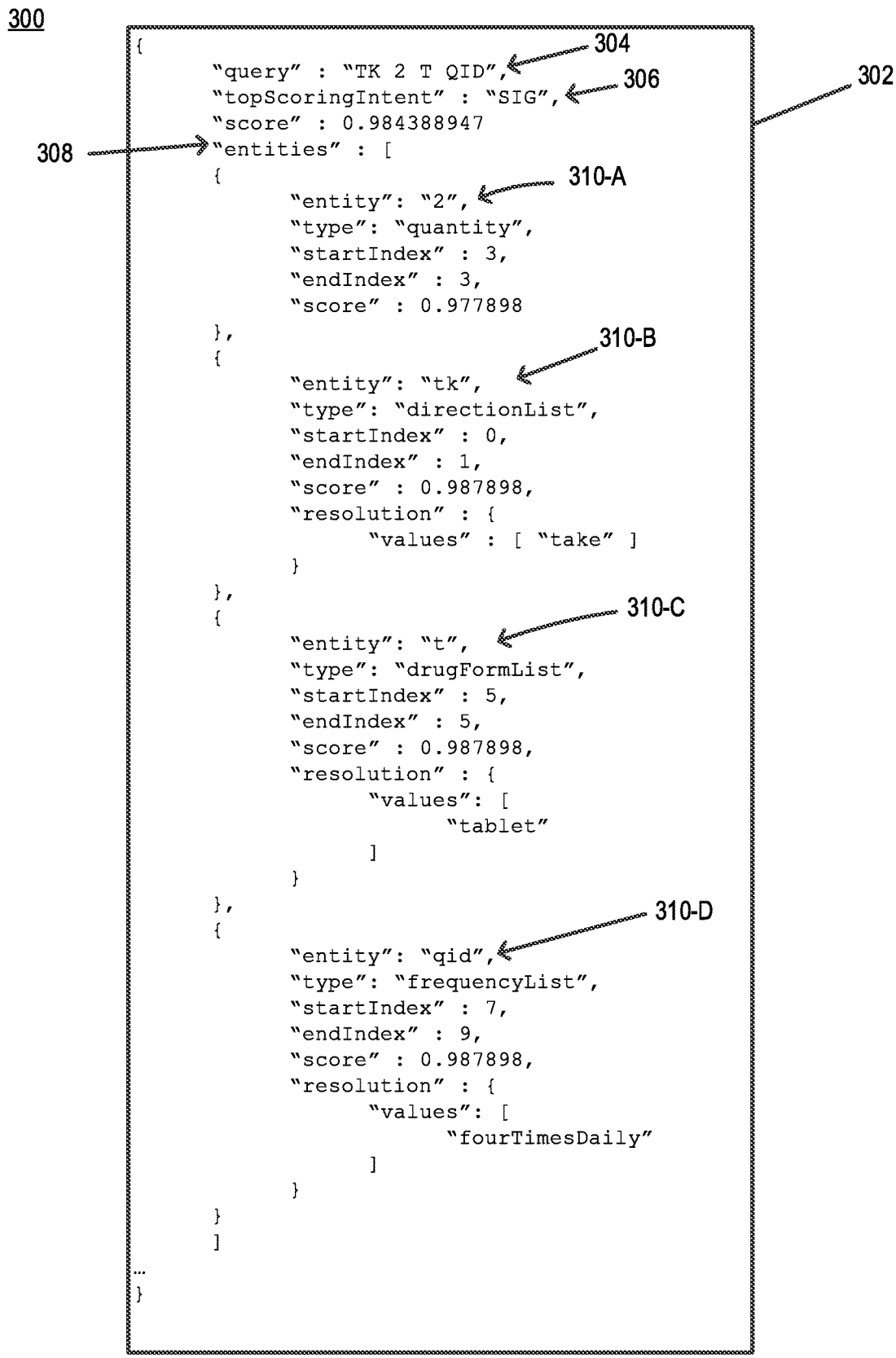
FIG. 3 depicts exemplary structured output of a machine learning model for automatically translating sig codes, according to one embodiment.

The ML operation module 132 may load a model (e.g., a deep learning model) trained by the ML training module 130 from the memory 122 or another location. For example, the ML operation module 132 may load a trained ML model and pass a series of parameters (e.g., one or more sig codes). The ML operation module 132 may receive from the trained machine learning model an output as depicted in FIG. 3, for example. The ML operation module may select a trained model based on an intent identified in a sig code. For example, when the sig code includes a first intent, the ML operation module 132 may select a first model (e.g., a single-instruction model).

In some embodiments, the ML operation module 132 may load a pre-trained natural language model. For example, recognizing email addresses in natural language may be a task that is widely applicable to many problem domains. As such, a pre-trained natural language module may be created that allows multiple applications to reuse a pre-trained model for the purpose of identifying email addresses in utterances. In some embodiments of the present application, the ML operation module 132 may use one or both of a trained model for identifying entities within sig codes, and a pretrained model for identifying other more general entity types (e.g., an email address, a physical address, person names, etc.).

The verification module 134 may include one or more rules for evaluating sig codes. The rules may include logic for determining whether the entities identified by the trained ML model are incomplete, invalid or incorrect. For example, the rules may reject any sig code that does not include at least a quantity entity and a frequency entity. In some embodiments, the verification module 134 rules may analyze entities to identify commonly-confused medications. The rules may analyze aspects of identified entities (e.g., quantity, frequency, duration, etc.) to determine whether those aspects are within predetermined prescribing limits. The verification module 134 rules may be stored in the database 150, for example. In some embodiments, the verification module 134 may access the electronic health records (EHR) of the patient, to assess the legitimacy of a sig code output. For example, the verification module 134 may determine by analyzing the patient's EHR whether a short-acting or fast-acting insulin is appropriate, and evaluate the correctness of the sig code accordingly. The verification module 134 may output an indication of verification with respect to the sig code (e.g., a Boolean value).

The scheduling module 136 may include instructions for analyzing the output of the ML operation module 132 to create a prescription schedule. For example, the scheduling module 136 may analyze the input sig code 304 of FIG. 3. The scheduling module 136 may generate an electronic calendar object (e.g., a calendar formatted according to the Internet Calendaring and Scheduling Core Object Specification). The scheduling module 136 may configure the calendar object such that the user will take the prescribed quantity (e.g., 2) of the drugFormList (e.g., a tablet) according to the directionList (e.g., take) at the prescribed frequencyList interval (e.g., fourTimesDaily). For example, the scheduling module 136 instructions may analyze the output and fill in a title of the calendar object with a text title corresponding to the expanded sig code (e.g., "take two tablets four times daily"). The instructions may configure the calendar object to include four reminders, spaced three hours apart, during predetermined waking hours (e.g., from 8 am and 8 pm). More flexible and complex calendaring logic is envisioned.

The pharmacy management system 102 may include an input device 160 and an output device 162 that allow the user to access (i.e., provide input to and perceive outputs of) the pharmacy management system 102. The input device 160 includes one or more components to facilitate the pharmacy management system 102 to accept input from the user. For example, the input device 160 may include a keyboard and/or a microphone, with associated software (e.g., a driver/firmware). The output device 162 may include any suitable display technology (e.g., LED, OLED, LCD, etc.) for displaying information. In some embodiments, the input device 160 and the output device 162 may be integrated (e.g., in a touchscreen display). Generally, the input device 160 and the display device 162 combine to enable the user to interact with the pharmacy management system 102.

The pharmacy management system 102 may include an application programming interface (API) 170 by which a third party (e.g., a customer of the proprietor of the pharmacy management system 102) may access the present techniques. The API 170 may be implemented as an endpoint accessible via a web service protocol, such as representational state transfer (REST), Simple Object Access Protocol (SOAP), JavaScript Object Notation (JSON), etc. For example, an API client (e.g., a remote computing device) may access the API 170 by submitting an HTTP response including a sig code. The API 170 may pass the submitted HTTP response to a module of the pharmacy computing system 102. The API 170 may receive an output as shown in FIG. 3, in some embodiments. The API 170 may return the output via HTTP to the API client.

Generally, the physician computing system 104 may be part of a computing system of a physician. For example, the physician computing system 104 may be located at a data center, a clinic, a hospital, or a physician's office (e.g., the physician's office). The physician computing system 104 may include a processor, a NIC and a memory including one or more modules for transmitting sig codes via the network to the pharmacy management system 102. While FIG. 1 depicts one physician computing system 104, any number of physician computing systems 104 may be included in the environment 100, according to some embodiments.

The patient computing device 106 may be any suitable device, such as a smart phone, a tablet, a desktop computer, etc. The patient may receive information (e.g., an electronic calendar object) via the patient computing device 106 via the network 108. The patient computing device 106 may include a processor and a memory including instructions (e.g., instructions corresponding to a mobile computing application) that when executed, cause the received information to be displayed in a display screen of the patient computing device 106. The pharmacy management system 102 may be communicatively coupled to other components in the environment 100 (e.g., the patient computing device 106 and/or the physician computing system 104) via the network 108. While FIG. 1 depicts one patient computing device 106, any number of patient computing devices 106 may be included in the environment 100, according to some embodiments.

In some embodiments, the patient computing device 106 may include computer-executable instructions for retrieving/receiving a trained model (e.g., a natural language processing (NLP) model) from the pharmacy computing system 102. Once retrieved, the pharmacy computing system 102 may process information (e.g., perform sig code translation) on the patient computing device 106. Processing information locally advantageously saves computing resources, as no network or remote computing resources are required.

The network 108 may be a single communication network, or may include multiple communication networks of one or more types (e.g., one or more wired and/or wireless local area networks (LANs), and/or one or more wired and/or wireless wide area networks (WANs) such as the Internet). The network 108 may enable bidirectional communication between the pharmacy management system 102, the patient computing device 106 and the physician computing system 104.

In operation, the user may access the pharmacy management system 102. For example, the user may access the pharmacy management system 102 at a station of a pharmacy (e.g., an order entry workstation, a filling/entry workstation, a payment workstation, a consultation workstation, etc.). In some embodiments, the pharmacy may be an online/virtual pharmacy or distribution center not accessible to the public. The pharmacy may include storage for medications and products, including restricted-access locations for storing controlled substances (e.g., narcotics) and refrigerated storage for perishable medications.

In operation, the pharmacy management system 102 may train one or more machine learning models using the ML training module 130. The training may include analyzing labeled natural language utterances or any other suitable training strategies. Once the one or more machine learning models are trained, the pharmacy management system 102 may receive one or more sig codes (e.g., from a pharmacist via the input device 160, from the physician computing system 104, etc.). The pharmacy management system 102 may analyze the sig codes using the ML operation module 132 to generate respective outputs. The pharmacy management system 102 may store the outputs generated by the ML model in the database 150 and/or in the memory 122. One or more modules (e.g., the verification module 134 and/or the scheduling module 136) may analyze the outputs further. In some embodiments, the pharmacy management system 102 may be configured to take action (e.g., send email, reject a prescription, return a code, etc.) when a sig code is found by the verification module 134 to include incorrect/invalid information.

For example, in some embodiments, the pharmacy management system 102 may be used by a prescriber (e.g., a pharmacist) to enter and/or validate sig codes. The prescriber may access an application stored within the memory 122. The application may access the verification module 134. The verification module 134 may include instructions for receiving one or more utterances of the user via the input device 160 (e.g., a microphone). The verification module 134 may access one or more models trained to translate utterances to text (e.g., one or more NLP models). The verification module 134 may analyze the textual output of the translation models, wherein the textual output corresponds to the words spoken by the prescriber in the utterances. The present techniques may include analyzing the textual output to generate once or more sig codes corresponding to the prescriber utterances. The present techniques may include validating the generated sig codes as discussed above for completeness, validity and/or correctness.

In some embodiments, the scheduling module 136 may store and/or transmit an electronic calendar object (e.g., to the patient computing device 106). The environment 100 supports other flexible configurations. For example, in an embodiment, the pharmacy management system includes an API module (not depicted) for performing the automated sig code analysis techniques discussed herein as a paid service (e.g., as part of a Software-as-a-Service platform).

In some embodiments, information may be processed exclusively on the patient computing system 102, as discussed above. For example, the patient may use an application installed in the patient computing system 102 to capture a photograph of a prescription (e.g., a prescription bottle, a written prescription, etc.) that includes a sig code and/or textual instructions. The application may include one or more trained models for analyzing the image to extract text information. The application may include further instructions for processing the extracted text information using a trained NLP model to generate a parsed output corresponding to the sig code, for example, as depicted in FIG. 3 below. The application may include further instructions for processing the parsed output to create one or more electronic calendar objects. The application may use operating system API features to integrate the electronic calendar objects into one or more calendar applications of the patient computing system 102.

Exemplary Machine Learning Model Training

As noted, the present techniques may include training one or more ML models (e.g., one or more NLP models) to identify one or more intents and one or more entities from a natural language utterance (e.g., by analyzing one or more sig codes).

Exemplary Intents

In general, the present techniques may identify an intent corresponding to a sig code (e.g., a default intent). In some embodiments, multiple intents may be defined, and entity analysis may branch according to the intent identified. For example, in an embodiment, a module of the memory 122 may be configured to determine whether a sig code corresponds to a single instruction sig code or a multi-instruction sig code. An example of a multi-instruction sig code is "take 2 for 10 days, then take 1 for five days." By identifying different intents according to the number of instructions in a sig code utterance, the present techniques advantageously provide more efficient and accurate processing and allow delegation of analysis to an appropriate model (e.g., a single-instruction ML model vs. a multi-instruction ML model).

Exemplary Entities

Figure 2:
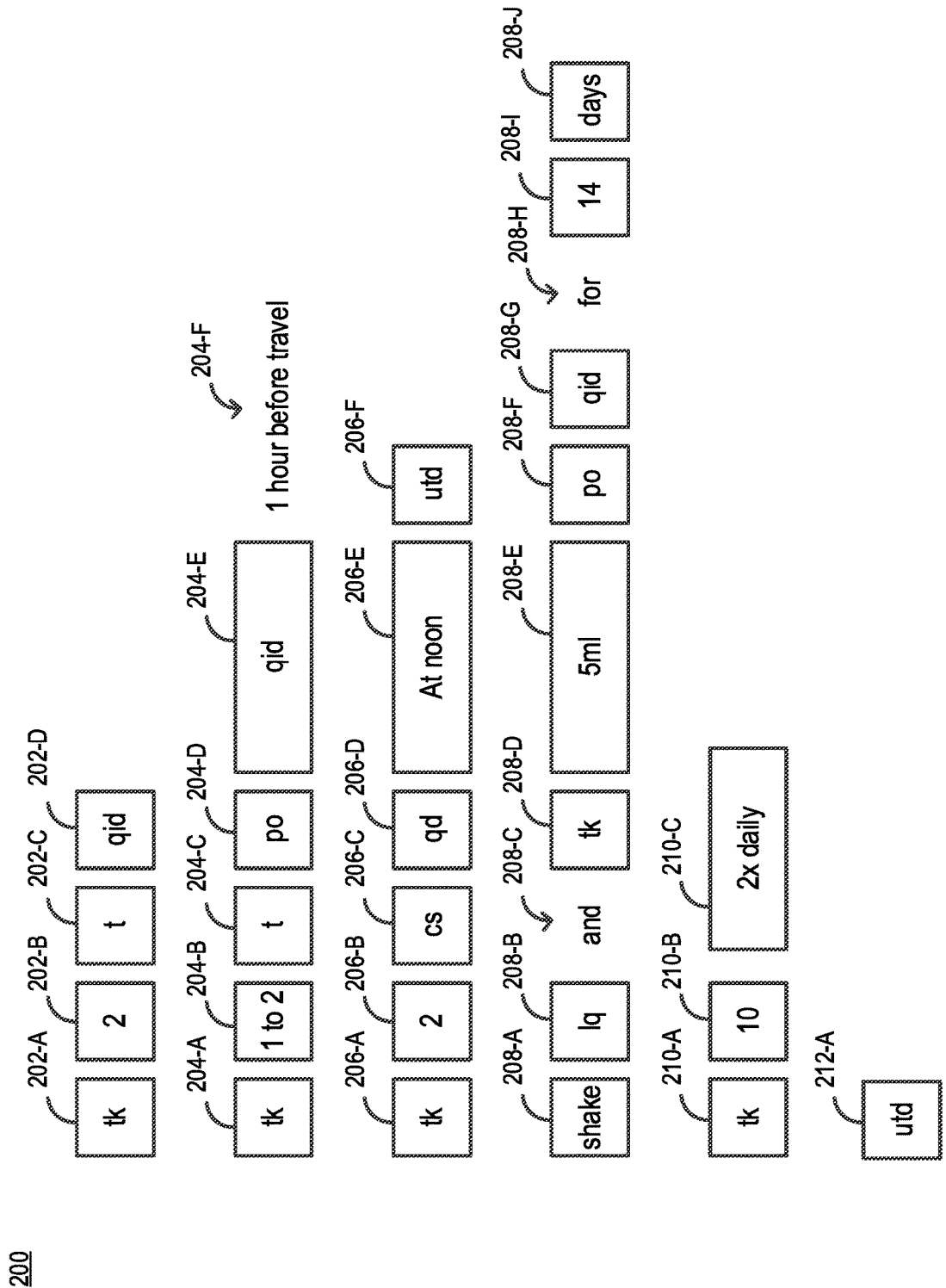
FIG. 2 depicts exemplary unstructured sig codes expressed in natural language, according to one embodiment.

The present techniques may include a list of entities (e.g., stored in the database 150 of FIG. 1). The user (e.g., an application developer) may define the list of entities prior to model training. Each entity may correspond to a respective type. The types may correspond to a composite type or a list type. For example, the following table depicts a non-exclusive list of entities and corresponding types:

Entity Name Entity Type
direction List List
Dosage Simple
drugFormList List
durationComposite Composite
Email Simple
frequencyComposite Composite
frequencyList List
notesList List
patientName Simple
routeList List symptom List List
timeOf Day Simple
timeOfDayList List
timeQuantity Simple Once the entities are defined, the user may associate, or label, one or more parts of utterances to correspond to the entities. For example, FIG. 2 depicts a listing 200 of exemplary sig code utterances (e.g., spoken or written) wherein one or more entities within each utterance may be labeled. The ML training module 130 may analyze the labels during the training process. The listing 200 includes a sig code 202 including a plurality of entities. The sig code 202 includes a direction List entity 202-A, a quantity entity 202-B, a drug Form List entity 202-C and a frequencyList entity 202-D.

FIG. 2 further depicts a sig code 204 including a directionList entity 204-A, a quantityComposite entity 204-B, a drugFormList entity 204-C (i.e., t, or tablet), a routeList entity 204-D (i.e., per os, or by mouth), a frequencyList entity 204-E (i.e., quater in die, or four times per day), and an unlabeled text portion 204-F.

FIG. 2 further depicts a sig code 206 including a directionList entity 206-A, a quantity entity 206-B, a drug Form List entity 206-C, a frequencyList entity 206-D, a timeOf Day entity 206-E, and a directionList entity 206-F (i.e., ut dictum, or use as directed).

FIG. 2 further depicts a sig code 208 including a directionList entity 208-A, a drug Form List entity 208-B, an unlabeled text portion 208-C, a directionList entity 208-D, a quantity entity 208-E, a routeList entity 208-F, a frequencyList entity 208-G, an unlabeled text portion 208-H, a timeQuantity entity 208-I, and a timeUnit entity 208-J.

In some embodiments, a quantity entity may be related to a dosage entity. For example, a sig code may be "tk 1 t (125 mcg) po qam b bre." In that case, a quantity 1 may be related to the dosage 125 mcg.

FIG. 2 further depicts a sig code 210 including a directionList entity 210-A, a quantity entity 210-B, and a frequencyList entity 210-C. It should be appreciated that information may be derived once the sig code such as sig code 210 is analyzed. For example, once the ML operation module 132 has determined that the sig code 21 includes a quantity and a frequency entity, the ML operation module 132 or another module (e.g., the scheduling module 136) may calculate the duration of the prescription. The ML module 132 may pass determined entity information to other modules for analysis. With respect to sig code 210, when the ML module 132 determines that the quantity entity 210-B is 10 and the frequencyList entity 210-C is two times daily, the scheduling module 136 may determine a duration of five days. In addition, FIG. 2 depicts a sig code 212 including a single directionList entity 212-A. The direction, utd, means use as directed. Those of ordinary skill in the art will appreciate that pharmacist instructions in the form of sig codes may be of any suitable length/complexity. When a prescription is accompanied by physical written instructions, a simple instruction such as the one in sig code 212 may be sufficient. Rules of the verification module 134 may be used to enforce only allowing sig codes with single directionList entities for certain pharmaceuticals.

The sig codes 202-212 are presented for exemplary purposes. It should be appreciated that a vast number of unique sig codes are possible, including many (e.g., thousands or more) unique entities. Entities may be expressed by a physician or pharmacist using natural language, which may include alternative spellings, misspellings and/or neologisms. The machine learning-based techniques disclosed herein advantageously allow all such variations to be understood and captured, without the need to predetermine all possible inputs. Specifically, the power of machine learning is the ability to understand de novo inputs (i.e., inputs that were not included in the labeled training data set of sig code examples) and to map known entities to the de novo inputs, to generate standardized output that can be used by other applications.

Exemplary Training Data

The user may label entities for training the one or more ML models. For example, the user may label entities 202-A through 202-D by selecting the entities via a graphical user interface of the pharmacy server 102, for example. In some embodiments, the user may enter a set of entity synonyms with their respective normalized values. The training data may include a mapping for one or more entity groups. For example, the training data may include a first mapping of direction entities:

| normalized values | synonym |
| --- | --- |
| instill | int |
| inhale | inl |
| inject | inj |
| apply | app, ap, aplicar |
| crush | cru |
| dissolve | dis |
| drink | drk |
| insert | i |
| rinse mouth | rm |
| swish and swallow | sas |
| spray | spr |
| swish and spit | ssp |
| shake well | sw |
| shake well and refrigerate | swr |
| take | tk |
| use | u |
| administer | adm |

The training data may include a second mapping of symptom entities:

| normalized values | synonym |
| --- | --- |
| pain | p |
| headache | ha |
| diarrhea | dh |
| chest pain | cp |
| cough | cou |
| congestion | cog |
| cough and congestion | cnc |
| anxiety | pra |
| shortness of breath | sob |
| vomiting | vom |
| wheezing | whz |

The association of synonyms to respective normalized (i.e., resolved) values may be used during the training of the ML model. Any suitable means for labeling the entities may be used. The trained model may output the normalized value corresponding to an input value. For example, the trained model may analyze a sig code including the term "qid" and output a normalized value of fourTimesDaily corresponding to an entity qid of type frequencyList. The trained ML model may output the same normalized value based on an analysis of a sig code of "4× daily." FIG. 3 depicts exemplary output of the trained ML model. It should be appreciated that for some entities (e.g., an integer quantity), the normalized value is the identity function. In other words, the entity is itself normalized.

Exemplary Trained Machine Learning Model Output

FIG. 3 depicts an exemplary trained machine learning output diagram 300. The output diagram 300 includes a hierarchical output 302. The output 302 includes an input sig code 304 that the trained ML model analyzed to generate the output 302. The output 302 includes a predicted intent 306 including a probability score. The output 302 includes a plurality of predicted entity results 308. Each of the entity results 308 includes an entity corresponding to an entity the ML model identified by analyzing the input sig code 304.

Specifically, the output 302 includes entity results 310-A through 310-D. The entity result 310-A corresponds to the extracted quantity of the sig code 304. The entity result 310-A includes string position indices and a model confidence score. No normalized value is provided, as the quantity (i.e., 2) is already normalized. The entity result 310-B corresponds to a directionList entity and further includes a normalized value (i.e., take) corresponding to the sig code entity (i.e., tk). The entity result 310-C and the entity result 310-D each include an identified entity synonym (t and qid, respectively) as well as the entity type, string position and confidence scores as shown in entity results 310-A and 310-B. The entity result 310-C and the entity result 310-D include respective normalized values corresponding to the respective identified entities (i.e., tablet and fourTimesDaily).

A module of the pharmacy management system 102 (e.g., the ML operation module 132) may output the output 302. The pharmacy management system 102 may transmit the output 302 to another module/application (e.g., the schedule module 136). In some cases, the pharmacy management system 102 may transmit the output 302 via the network 108 to a remote computing device. In some embodiments, the output 302 may be output in a different hierarchical format (e.g., as XML) or in a non-hierarchical data format (e.g., as comma-separated values (CSV)). The output 302 may be encoded in a binary data format for more efficient transmission/processing by a downstream application.

Exemplary Computer-Implemented Methods

Figure 4:
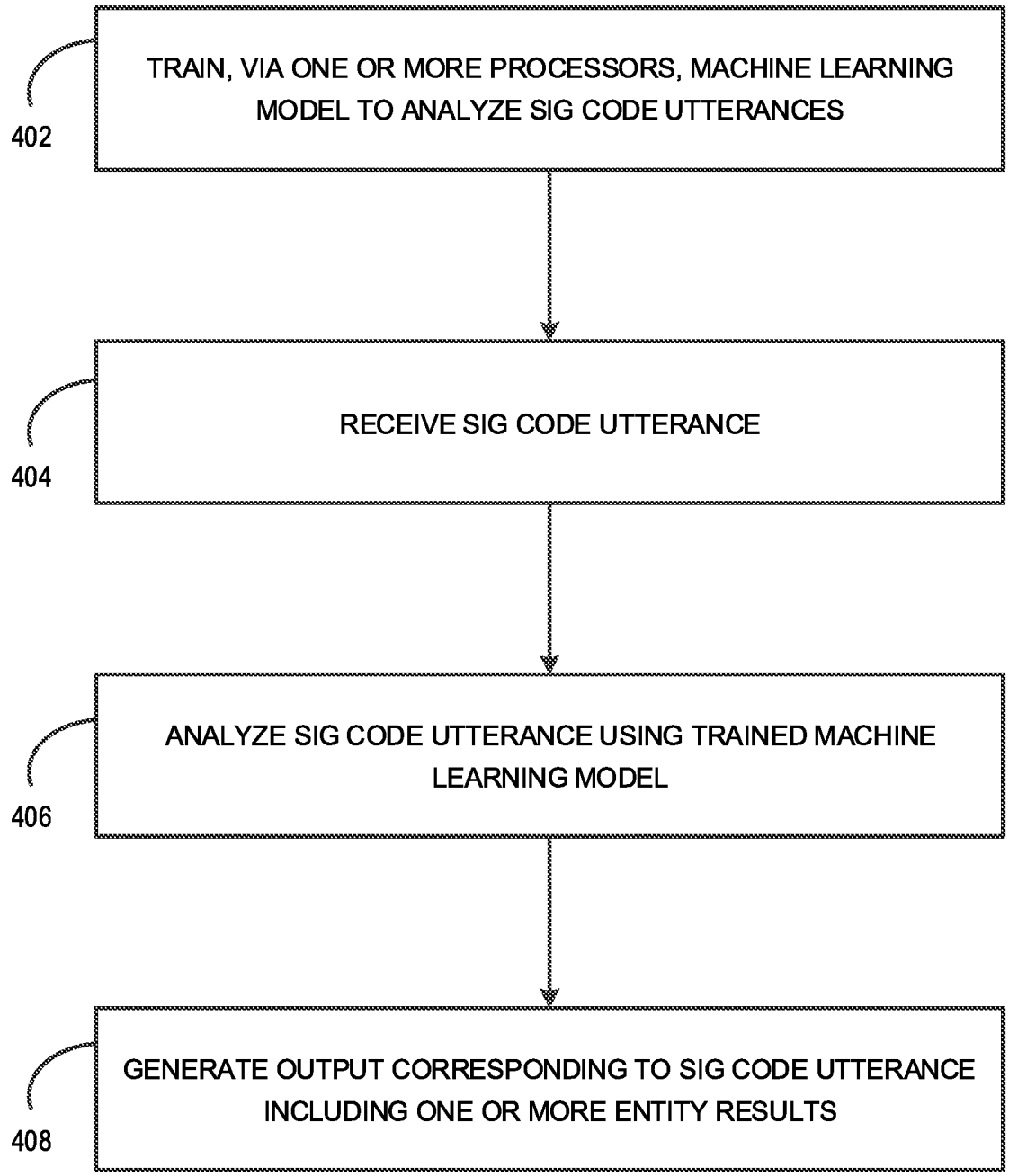
FIG. 4 depicts a flow diagram for automated sig code translation, according to one embodiment and scenario.

FIG. 4 depicts a flow diagram of an exemplary computer-implemented method 400 for performing automated sig code translation using machine learning. The method 400 may include training, via the one or more processors, a machine learning model to analyze a sig code utterance (block 402). As noted above, training the ML model may include analyzing a set of one or more labeled sig code utterances. The training may include analyzing the utterances with a supervised learning technique, such as an artificial neural network. The ML training module 130 of FIG. 1 may train multiple models.

The method 400 may include receiving the sig code utterance (block 404). The pharmacy management system 102 may be configured as discussed with respect to the environment 100 in some embodiments. For example, the user may type one or more sig codes using the input device 160. The pharmacy management system 102 may receive/retrieve the typed sig codes. In some embodiments, the pharmacy management system 102 may receive the sig codes from another computing system operated by the proprietor of the environment 100 or from another source. The ML operation module 132 may process the sig codes using one or more trained ML models. For example, a sig code may be represented as a string in any suitable programming language.

The method 400 may include analyzing the sig code utterance using the trained machine learning model, wherein the analyzing includes identifying one or more entities within the sig code utterance. For example, the identified entities may correspond to those discussed above with respect to FIG. 2.

The method 400 may include analyzing the sig code utterance using the trained machine learning model, wherein the one or more entities includes at least one quantity entity and at least one frequency entity (block 406). The quantity and frequency entities may be used to compute additional aspects related to a treatment or prescription (e.g., a duration). For example, the frequency entity may be a frequencyList as shown with respect to FIG. 2. In some embodiments, analyzing the sig code utterance may include analyzing the sig code utterance using a pre-trained machine learning model, for example to extract general entities (e.g., an email address, a physical address, a telephone number, a person name, etc.) that are not exclusive to analyzing sig code utterances.

The method 400 may include generating an output corresponding to the sig code utterance including one or more entity results, each entity result including an entity type, an entity name, and an entity normalized value corresponding to a respective one of the one or more entities within the sig code utterance (block 408). The output may correspond to the output 302 of FIG. 3, in some embodiments. As noted above, the output may be analyzed by the scheduling module 136 and/or provided to another module or system. In some embodiments, generating the output may include adding general entities identified by a pre-trained model.

ADDITIONAL CONSIDERATIONS

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of ordinary skill in the art will appreciate still additional alternative structural and functional designs for implementing the techniques disclosed herein through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed:

1. A pharmacy management system for automated sig code translation using machine learning, comprising:
   one or more processors; and
   a memory storing instructions that, when executed by the one or more processors, cause the pharmacy management system to
   train, via the one or more processors, a machine learning model to analyze sig code utterances,
   receive a sig code utterance,
   analyze the sig code utterance using the trained machine learning model, wherein the analyzing includes identifying one or more entities within the sig code utterance, and wherein the one or more entities includes at least one quantity entity and at least one frequency entity; and
   generate an output corresponding to the sig code utterance including one or more entity results, each entity result including an entity type, an entity name, and an entity normalized value corresponding to a respective one of the one or more entities within the sig code utterance.

2. The pharmacy management system of claim 1, the memory storing further instructions that, when executed by the one or more processors, cause the pharmacy management system to
   train the machine learning model to analyze sig code utterances by training a natural language machine learning model using a training data set of labeled sig code utterances.

3. The pharmacy management system of claim 1, the memory storing further instructions that, when executed by the one or more processors, cause the pharmacy management system to
   receive the sig code utterance from a physician computing system.

4. The pharmacy management system of claim 1, the memory storing further instructions that, when executed by the one or more processors, cause the pharmacy management system to
   analyze the output corresponding to the sig code utterance to generate an indication of verification.

5. The pharmacy management system of claim 1, the memory storing further instructions that, when executed by the one or more processors, cause the pharmacy management system to
   analyze the output corresponding to the sig code utterance to generate an electronic calendar object; and
   transmit the electronic calendar object to a patient computing device.

6. The pharmacy management system of claim 1, the memory storing further instructions that, when executed by the one or more processors, cause the pharmacy management system to
   analyze the sig code utterance using a pre-trained machine learning model, to identify one or more general entities.

7. The pharmacy management system of claim 1, the memory storing further instructions that, when executed by the one or more processors, cause the pharmacy management system to
   receive the sig code utterance from an application programming interface client via an application programming interface, and
   transmit the output corresponding to the sig code utterance to the application programming interface client.

8. A computer-implemented method for automated sig code translation using machine learning, the method comprising:
   training, via one or more processors, a machine learning model to analyze sig code utterances,
   receiving a sig code utterance,
   analyzing the sig code utterance using the trained machine learning model,
      wherein the analyzing includes identifying one or more entities within the sig code utterance, and
      wherein the one or more entities includes at least one quantity entity and at least one frequency entity; and
   generating an output corresponding to the sig code utterance
   including one or more entity results, each entity result including an entity type, an entity name, and an entity normalized value corresponding to a respective one of the one or more entities within the sig code utterance.

9. The computer-implemented method of claim 8, further comprising:
   training the machine learning model to analyze sig code utterances by training a natural language machine learning model using a training data set of labeled sig code utterances.

10. The computer-implemented method of claim 8, further comprising:
    receiving the sig code utterance from a physician computing system.

11. The computer-implemented method of claim 8, further comprising:
    analyzing the output corresponding to the sig code utterance to generate an indication of verification.

12. The computer-implemented method of claim 8, further comprising:
    analyzing the output corresponding to the sig code utterance to generate an electronic calendar object; and
    transmitting the electronic calendar object to a patient computing device.

13. The computer-implemented method of claim 8, further comprising:
    analyzing the sig code utterance using a pre-trained machine learning model, to identify one or more general entities.

14. The computer-implemented method of claim 8, further comprising:
receive the sig code utterance from an application programming interface client via an application programming interface, and
transmit the output corresponding to the sig code utterance to the application programming interface client.

15. A non-transitory computer readable medium containing program instructions that when executed, cause a computer to:
train a machine learning model to analyze sig code utterances,
receive a sig code utterance,
analyze the sig code utterance using the trained machine learning model,
wherein the analyzing includes identifying one or more entities within the sig code utterance, and
wherein the one or more entities includes at least one quantity entity and at least one frequency entity; and
generate an output corresponding to the sig code utterance including one or more entity results, each entity result including
an entity type, an entity name, and an entity normalized value corresponding to a respective one of the one or more entities within the sig code utterance.

16. The non-transitory computer readable medium of claim 15 containing further program instructions that when executed, cause a computer to:
train the machine learning model to analyze sig code utterances by training a natural language machine learning model using a training data set of labeled sig code utterances.

17. The non-transitory computer readable medium of claim 15 containing further program instructions that when executed, cause a computer to:
analyze the output corresponding to the sig code utterance to generate an indication of verification.

18. The non-transitory computer readable medium of claim 15 containing further program instructions that when executed, cause a computer to:
analyze the output corresponding to the sig code utterance to generate an electronic calendar object; and
transmit the electronic calendar object to a patient computing device.

19. The non-transitory computer readable medium of claim 15 containing further program instructions that when executed, cause a computer to:
analyze the sig code utterance using a pre-trained machine learning model, to identify one or more general entities.

20. The non-transitory computer readable medium of claim 15 containing further program instructions that when executed, cause a computer to:
receive the sig code utterance from an application programming interface client via an application programming interface, and
transmit the output corresponding to the sig code utterance to the application programming interface client.

* * * * *